(12) United States Patent
Blondel et al.

(10) Patent No.: US 8,765,849 B2
(45) Date of Patent: Jul. 1, 2014

(54) REINFORCED FLAME-RETARDANT POLYAMIDE COMPOSITION

(75) Inventors: Philippe Blondel, Bernay (FR); Eric Gamache, Philadelphia, PA (US); Benjamin Saillard, Bernay (FR); Barbara Ramfel, Barc (FR)

(73) Assignee: Arkema France, Colombes (FR)

( * ) Notice: Subject to any disclaimer, the term of this patent is extended or adjusted under 35 U.S.C. 154(b) by 343 days.

(21) Appl. No.: 13/146,407

(22) PCT Filed: Jan. 27, 2010

(86) PCT No.: PCT/FR2010/050117
§ 371 (c)(1),
(2), (4) Date: Oct. 11, 2011

(87) PCT Pub. No.: WO2010/086546
PCT Pub. Date: Aug. 5, 2010

(65) Prior Publication Data
US 2012/0040115 A1    Feb. 16, 2012

(30) Foreign Application Priority Data

Jan. 28, 2009    (FR) .................................. 09 50517

(51) Int. Cl.
*C08L 77/06*    (2006.01)

(52) U.S. Cl.
USPC ......... 524/133; 428/34.5; 428/36.4; 524/126; 524/135; 264/328.1; 264/176.1

(58) Field of Classification Search
USPC ....................................................... 524/133
See application file for complete search history.

(56) References Cited

U.S. PATENT DOCUMENTS

| | | | |
|---|---|---|---|
| 7,323,504 B2 | 1/2008 | Steenbakkers-Menting et al. | |
| 2004/0021135 A1 | 2/2004 | Steenbakkers-Menting et al. | |
| 2005/0119379 A1 | 6/2005 | Martens et al. | |
| 2007/0054992 A1* | 3/2007 | Urata et al. | 524/100 |
| 2007/0060719 A1* | 3/2007 | Clement et al. | 525/524 |
| 2007/0299171 A1 | 12/2007 | Couillens et al. | |
| 2008/0090946 A1 | 4/2008 | Steenbakkers-Menting et al. | |
| 2009/0099318 A1* | 4/2009 | Miyamoto et al. | 525/421 |
| 2009/0156716 A1 | 6/2009 | Steenbakkers-Menting et al. | |
| 2010/0069539 A1 | 3/2010 | Morimoto et al. | |
| 2010/0105812 A1 | 4/2010 | Bussi et al. | |

FOREIGN PATENT DOCUMENTS

| | | |
|---|---|---|
| EP | 1 697 456 | 9/2006 |
| EP | 1 956 046 | 8/2008 |
| EP | 1 956 048 | 8/2008 |
| JP | 200025646 A | 1/2000 |
| JP | 2004510863 A | 4/2004 |
| JP | 2007297568 A | 11/2007 |
| JP | 2008 163317 | 7/2008 |
| JP | 2008222920 A | 9/2008 |
| WO | WO 2007/132733 * | 11/2007 |
| WO | 2008104719 A2 | 9/2008 |

OTHER PUBLICATIONS

International Search Report for PCT/FR2010/050117 dated May 4, 2010.
Lao, S. et al., "Fire retardant intumescent polyamide 11 nanocomposites," 39th International Sampe Technical Conference—From art to science: Advancing materials and process Engineering, Oct. 29, 2007.
Machine Translation of JP2007297568A dated Nov. 15, 2007; Arkema France.
Machine Translation of JP2008222920A; dated Sep. 25, 2008; Toray Industries.
Machine Translation of JP2000256460, dated Jan. 25, 2000.

* cited by examiner

*Primary Examiner* — Doris Lee
(74) *Attorney, Agent, or Firm* — Millen, White, Zelano & Branigan, P.C.

(57) ABSTRACT

The invention relates to a composition comprising, relative to the total weight of the composition:
  between 25% and 52% by weight of at least one semi-crystalline or amorphous polyamide, having an amine chain-end content of less than 0.040 meq/g,
  between 24% and 40% by weight of at least one reinforcer, and
  between 24% and 35% by weight of at least one metal salt, optionally contained in a polymer, chosen from a metal salt of phosphinic acid, a metal salt of diphosphinic acid, and a mixture thereof.

The invention also relates to the process for preparing this composition and its use.

14 Claims, No Drawings

REINFORCED FLAME-RETARDANT POLYAMIDE COMPOSITION

The present invention relates to a composition comprising at least one particular polyamide, at least one reinforcer and at least one particular flame retardant, to a process for preparing the said composition and to uses of the said composition.

It has been known for a long time that the incorporation of additives into polymers makes it possible to improve their working properties. Thus, the additive chosen on the basis of its particular function gives the material as a whole the expected properties, for instance impact strength, insulating, etc. properties. However, it turns out that the addition of these additives, often numerous, occasionally makes the composition more difficult to work. Thus, the polymer matrix may partly lose the properties for which it was chosen.

It is known practice from documents EP 1 697 456, US 2007/0072967 or US 2005/0119379 to combine flame retardants, and especially phosphinates, with reinforcers in a polyamide matrix in order to obtain a rigid material with good impact strength and good flame-retardant properties.

These criteria are essential for the finished material, which may be used in the field of electrical and electronic equipment.

However, it is found that these materials are not always easy to transform, i.e. they are not very fluid. Surprisingly, it has been found that the melt viscosity of certain materials changes during their transformation and implementation, which is very inconvenient for the manufacturer.

Furthermore, added to these criteria, materials are also actively sought that meet as far as possible the concerns in terms of sustainable development, by especially limiting the supplies of raw materials derived from the petroleum industry for their manufacture.

Raw materials derived from biomass, generally known as bio-sourced or bio-resourced materials, may be renewed and generally have a reduced environmental impact, since they are already functionalized, and so require fewer transformation steps.

Since a renewable raw material is a natural, animal or plant resource, whose stock may be reconstituted over a short period on a human timescale, it is necessary for this stock to be able to be renewed as quickly as it is consumed.

Moreover, as they are formed from non-fossil carbon, during their incineration or degradation, the $CO_2$ derived from these materials does not contribute to the accumulation of $CO_2$ in the atmosphere.

The term biomass means naturally produced raw material of plant or animal origin. This type of raw material is characterized in that the plant, for its growth, has consumed atmospheric $CO_2$ while producing oxygen. Animals, for their growth, have for their part consumed this plant raw material and have thus assimilated the carbon derived from atmospheric $CO_2$.

Thus, these raw materials derived from biomass require fewer refining and transformation steps, which are very energy intensive. The production of $CO_2$ is reduced, and as such these raw materials contribute less to global warming. For example, plants consume atmospheric $CO_2$ at a rate of 44 g of $CO_2$ per mole of carbon (or per 12 g of carbon) for their growth. Thus, the use of a raw material derived from biomass begins by decreasing the amount of atmospheric $CO_2$. Plant materials, including algae and microalgae in the marine environment, have the advantage of being able to be grown in large amount, according to demand, throughout the majority of the globe.

It is thus important to propose a material that is easier to implement, while at the same time maintaining good impact strength and rigidity properties and good flame-retardant properties, and whose polymer matrix may advantageously comprise, in its structure, units derived from raw materials originating from biomass.

Other characteristics, aspects, subjects and advantages of the present invention will emerge even more clearly on reading the description and the examples that follow.

A subject of the present invention is thus firstly a composition comprising, the percentages being given in relation to the total weight of the composition:

between 25% and 52% by weight of at least one semi-crystalline or amorphous polyamide, having an amine chain-end content of less than 0.040 meq/g, between 24% and 40% by weight of at least one reinforcer, and between 24% and 35% by weight of at least one metal salt, optionally contained in a polymer, chosen from a metal salt of phosphinic acid, a metal salt of diphosphinic acid, and a mixture thereof.

It turns out that a composition comprising such characteristics makes it possible to obtain a stable melt viscosity during its transformation, while at the same time having very advantageous flame-retardant properties, i.e. a classification V0 according to the test UL94 (according to Standard NFT 51072) for a thickness of 0.8 mm, satisfactory rigidity and also very satisfactory impact strength, leading to an impact of greater than 8 $kJ/m^2$.

The invention also relates to a process for preparing such a composition.

Unlike materials derived from fossil matter, raw materials derived from biomass contain $^{14}C$ in the same proportions as atmospheric $CO_2$. All the carbon samples taken from live organisms (animals or plants) are in fact a mixture of three isotopes: $^{12}C$ (representing about 98.892%), $^{13}C$ (about 1.108%) and $^{14}C$ (traces: $1.2 \times 10^{-10}$%). The $^{14}C/^{12}C$ ratio of living tissue is identical to that of the atmosphere. In the environment, $^{14}C$ exists in two predominant forms: in mineral form and in organic form, i.e. carbon incorporated into organic molecules such as cellulose.

In a live organism, the $^{14}C/^{12}C$ ratio is kept constant by the metabolism, since the carbon is continually exchanged with the environment. Since the proportion of $^{14}C$ in the atmosphere is constant, this is likewise the case in the organism, while it is alive, since it absorbs this $^{14}C$ just as it absorbs $^{12}C$. The mean $^{14}C/^{12}C$ ratio is equal to $1.2 \times 10^{-12}$. Carbon-14 is produced by the bombardment of atmospheric nitrogen (14), and oxidizes spontaneously with the oxygen in the air to give $CO_2$. In our human history, the content of $^{14}CO_2$ has increased following atmospheric nuclear explosions, but has since not ceased to decrease following the stoppage of these tests.

$^{12}C$ is stable, i.e. the number of $^{12}C$ atoms in a given sample is constant over time. $^{14}C$ is itself radioactive (each gram of carbon of a living being contains enough $^{14}C$ isotopes to give 13.6 disintegrations per minute) and the number of such atoms in a sample decreases over time (t) according to the law:

$$n = n_0 \exp(-at),$$

in which:
no is the original number of $^{14}C$ (on the death of the creature, animal or plant),
n is the number of $^{14}C$ atoms remaining after time t,
a is the disintegration constant (or radioactive constant); it is related to the half-life.

The half-life (or period) is the time after which any number of radioactive nuclei or of unstable particles of a given species is reduced by half by disintegration; the half-life T1/2 is related to the disintegration constant a by the formula aT1/2=ln 2. The half-life of $^{14}C$ is 5730 years. In 50 000 years, the $^{14}C$ content is less than 0.2% of the initial content and thus becomes difficult to detect. Petroleum products, natural gas and coal therefore contain no $^{14}C$.

Given the half-life (T1/2) of $^{14}C$, the $^{14}C$ content is substantially constant from the extraction of the raw materials derived from biomass, up to the manufacture of the polymer according to the invention and even up to the end of its use.

Consequently, the presence of $^{14}C$ in a material, irrespective of the amount, gives an indication as to the origin of the molecules constituting it, i.e. that they originate from raw materials derived from biomass and not from fossil materials.

Preferably, the polyamide present in the composition according to the invention comprises at least 50% of organic carbon (i.e. of carbon incorporated into organic molecules) derived from raw materials originating from biomass according to Standard ASTM D6866 relative to the total amount of carbon in the polymer, preferably greater than 60% and preferentially greater than 80%. This content may be certified by determining the $^{14}C$ content according to one of the methods described in Standard ASTM D6866-06 (Standard Test Methods for Determining the Biobased Content of Natural Range Materials Using Radiocarbon and Isotope Ratio Mass Spectrometry Analysis).

This Standard ASTM D6866-06 comprises three methods for measuring organic carbon derived from raw materials originating from biomass, which is known as biobased carbon. These methods compare the data measured on the analysed sample with the data from a referenced sample that is 100% biobased or derived from biomass, to give a relative percentage of carbon derived from biomass in the sample. The proportions indicated for the polymers of the invention are preferably measured according to the mass spectrometry method or the liquid scintillation spectrometry method described in that standard.

Consequently, the presence of $^{14}C$ in a material, irrespective of the amount, gives an indication as to the origin of the molecules constituting it, i.e. that a certain fraction comes from raw materials derived from biomass rather than from fossil materials. The measurements performed by the methods described in Standard ASTM D6866-06 thus make it possible to distinguish starting monomers or reagents derived from materials originating from biomass, from monomers or reagents derived from fossil materials. These measurements serve as a test and enable certification of the content and origin of the carbon in a product.

It is pointed out that the expression "between" used in the preceding paragraphs, but also in the rest of the present description, should be understood as including each of the mentioned limits.

Thus, for the preparation of a polyamide obtained, for example, by polycondensation of a diacid with a diamine, using a dicarboxylic acid obtained from a raw material derived from biomass, polyamides are obtained that have mechanical, chemical and thermal properties of the order of those of the polyamides of the prior art obtained from diacids derived from petrochemistry, this satisfying at least one of the sustainable development concerns mentioned hereinabove, i.e. that of limiting the use of fossil resources.

The content expressed as a percentage of organic carbon derived from biomass in the polyamide of the composition according to the invention, noted % Corg.bio., is strictly greater than 0, the content % Corg.bio. corresponding to Equation (I) below:

$$\% \, C_{org.bio} = \frac{\sum_i Fi \times Ci + \sum_k Fk \times Ck'}{\left(\sum_j Fj \times Cj + \sum_i Fi \times Ci + \sum_k Fk \times Ck\right)} \times 100 \quad (I)$$

with i=monomer(s) derived from raw materials 100% derived from biomass,
j=monomer(s) derived from 100% fossil raw materials,
k=monomer(s) partly derived from raw materials derived from biomass,
Fi, Fj, Fk=respective mole fraction(s) of the monomers i, j and k in the polyamide,
Ci, Cj, Ck=respective number of carbon atoms in the monomers i, j and k in the polyamide,
Ck'=number of organic carbon atoms derived from biomass in the monomer(s) k,
the nature (derived from biomass or fossil), i.e. the source of each of the monomers i, j and k, being determined according to one of the measuring methods of Standard ASTM D6866.

The (co)monomers of the polyamide are monomers i, j and k within the meaning of Equation (I).

Preferably, the polyamide contains a content % Corg.bio. of greater than or equal to 50%, advantageously greater than or equal to 70% and preferably greater than or equal to 80%.

When the polyamide of the composition according to the invention has a content % Corg.bio. of greater than or equal to 25%, it satisfies the criteria for obtaining the "Biomass Pla" certification of the JBPA, this certification also being based on Standard ASTM D6866. The polyamide according to the invention may also validly bear the label "Bio-mass-based" from the Association JORA.

For example, the (co)monomer(s) may be derived from raw materials originating from biomass, such as plant oils or natural polysaccharides, such as starch or cellulose, the starch possibly being extracted, for example, from corn or potato. This or these (co)monomer(s), or starting materials, may in particular originate from various transformation processes, especially from standard chemical processes, but also from enzymatic transformation processes or via biofermentation.

For example, the C12 diacid (dodecanedioic acid) may be obtained by biofermentation of dodecanoic acid, also known as lauric acid, lauric acid possibly being extracted from the rich oil formed from palm kernel and from coconut, for example.

The C14 diacid (tetradecanedioic acid) may be obtained by biofermentation of myristic acid, myristic acid possibly being extracted from the rich oil formed from palm kernel and from coconut, for example.

The C16 diacid (hexadecanedioic acid) may be obtained by biofermentation of palmitic acid, the latter being found mainly in palm oil, for example.

Reference may be made to documents FR 2 912 753 and WO 2008/104719, which describe raw materials derived from biomass leading to polyamide monomers.

In general, the polyamides used in the composition according to the invention are semi-crystalline or amorphous and comprise at least two identical or different repeating units, these units possibly being formed from a dicarboxylic acid and a diamine, an aminocarboxylic acid, a lactam, or mixtures thereof.

The polyamide according to the invention may be a homopolyamide and may comprise at least two identical repeating units obtained from an aminocarboxylic acid, obtained from a lactam, or corresponding to the formula (Ca diamine).(Cb diacid), with a representing the number of carbon atoms in the diamine and b representing the number of carbon atoms in the diacid, a and b each being between 4 and 36, as defined hereinbelow.

The polyamide according to the invention may also be a copolyamide and may comprise at least two different repeating units, these units possibly being obtained from an aminocarboxylic acid, obtained from a lactam or corresponding to the formula (Ca diamine).(Cb diacid), with a representing the number of carbon atoms in the diamine and b representing the number of carbon atoms in the diacid, a and b each being between 4 and 36, as defined hereinbelow.

The polyamide according to the invention may comprise at least one aminocarboxylic acid chosen from 9-aminononanoic acid, 10-aminodecanoic acid, 12-aminododecanoic acid and 11-aminoundecanoic acid, and derivatives thereof, especially N-heptyl-11-aminoundecanoic acid.

The polyamide according to the invention may comprise at least one lactam chosen from pyrrolidinone, piperidinone, caprolactam, enantholactam, caprylolactam, pelargolactam, decanolactam, undecanolactam and laurolactam.

The polyamide according to the invention may comprise at least one unit corresponding to the formula (Ca diamine).(Cb diacid), the unit (Ca diamine) is of formula $H_2N-(CH_2)_a-NH_2$, when the diamine is aliphatic and linear.

Preferentially, when the Ca diamine is linear and aliphatic, it is chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12), tridecanediamine (a=13), tetradecanediamine (a=14), hexadecanediamine (a=16), octadecanediamine (a=18), octadecenediamine (a=18), eicosanediamine (a=20), docosanediamine (a=22) and diamines obtained from fatty acids.

Such aliphatic and linear diamines have the advantage of being able to comprise up to 100% of organic carbon derived from biomass and determined according to Standard ASTM D6866.

When the diamine is cycloaliphatic, it is preferably chosen from those comprising two rings. They especially correspond to the following general formula:

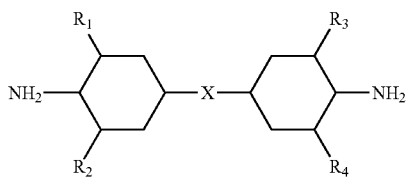

in which $R_1$, $R_2$, $R_3$ and $R_4$ represent identical or different groups chosen from a hydrogen atom or alkyl groups of 1 to 6 carbon atoms and X represents either a single bond or a divalent group formed:
 from a linear or branched aliphatic chain containing from 1 to 10 carbon atoms, optionally substituted with cycloaliphatic or aromatic groups of 6 to 8 carbon atoms,
 from a cycloaliphatic group of 6 to 12 carbon atoms.

More preferentially, the cycloaliphatic diamine of the polyamide according to the invention is chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis-(3-methyl-4-aminocyclohexyl)methane (noted BMACM, MACM or B), p-bis(aminocyclohexyl)methane (PACM) and isopropylidenedi(cyclohexylamine) (PACP).

A non-exhaustive list of these cycloaliphatic diamines is given in the publication "Cycloaliphatic Amines" (Encyclopaedia of Chemical Technology, Kirk-Othmer, 4th Edition (1992), pp. 386-405).

Preferably, when the diamine is alkylaromatic, it is chosen from 1,3-xylylenediamine and 1,4-xylylenediamine and a mixture thereof.

Preferably, when the monomer (Cb diacid) is aliphatic and linear, it is chosen from succinic acid (b=4), pentanedioic acid (b=5), adipic acid (b=6), heptanedioic acid (b=7), octanedioic acid (b=8), azelaic acid (b=9), sebacic acid (b=10), undecanedioic acid (b=11), dodecanedioic acid (b=12), brassylic acid (b=13), tetradecanedioic acid (b=14), hexadecanedioic acid (b=16), octadecanoic acid (b=18), octadecenedioic acid (b=18), eicosanedioic acid (b=20) and docosanedioic acid (b=22) and fatty acid dimers containing 36 carbons.

The diacids listed above have the advantage of being able to comprise up to 100% of organic carbon derived from biomass and determined according to Standard ASTM D6866.

Preferably, when the monomer (Cb diacid) is aromatic, it is chosen from terephthalic acid, noted T, and isophthalic acid, noted I, and naphthoic acid.

The fatty acid dimers mentioned above are dimerized fatty acids obtained by oligomerization or polymerization of unsaturated monobasic fatty acids containing a long hydrocarbon chain (such as linoleic acid and oleic acid), as described especially in document EP 0 471 566.

When the diacid is cycloaliphatic, it may comprise the following carbon backbones: norbornylmethane, cyclohexylmethane, dicyclohexylmethane, dicyclohexylpropane, di(methylcyclohexyl)-propane.

If, with the exception of N-heptyl-11-aminoundecanoic acid, the fatty acid dimers and the cycloaliphatic diamines, the comonomers or starting materials envisaged in the present description (amino acids, diamines, diacids) are effectively linear, there is nothing to stop it from being envisaged that they may be totally or partially branched, such as 2-methyl-1,5-diaminopentane, or partially unsaturated.

It will be noted in particular that the C18 dicarboxylic acid may be octadecanedioic acid, which is saturated, or octadecenedioic acid, which itself contains an unsaturation.

Preferably, the homopolyamide may be chosen from a homopolyamide PA 6.10 obtained by polycondensation of hexanediamine and decanedioic acid, PA B.12 also noted BMACM.12 obtained by polycondensation of bis(3-methyl-4-aminocyclohexyl)methane and dodecanedioic acid, PA 10.12 obtained by polycondensation of decanediamine and dodecanedioic acid, PA 10.10 obtained by polycondensation of decanediamine and decanedioic acid, PA 6.12 obtained by polycondensation of hexanediamine and decanedioic acid, and the homopolyamide PA11 obtained by polycondensation of amino-11-undecanoic acid.

Preferably, the copolyamide may be chosen from the following copolyamides: PA11/6.T, PA11/10.T, PA11/B.10, PA11/6, PA11/6.10, PA11/6.12, PA11/6.6, PA11/10.12, PA11/B.I/B.T.

Preferentially, the polyamide may be chosen from PA11, PA11/10.T and PA11/B.10.

The nomenclature used for defining polyamides is described in Standard ISO 1874-1:1992 "Plastiques—Matériaux polyamides (PA) pour moulage et extrusion—Partie 1:

Désignation [Plastics—Polyamide materials (PA) for moulding and extrusion—Part 1: Designation]", especially on page 3 (Tables 1 and 2) and is well known to those skilled in the art.

The composition according to the invention comprises between 25% and 52% by weight, advantageously between 30% and 52% by weight, preferably between 35% and 52% by weight and even more preferably between 40% and 52% by weight, relative to the total weight of the composition, of at least one semi-crystalline or amorphous polyamide.

The composition according to the invention may also comprise one or more semi-crystalline or amorphous homopolyamides or copolyamides, or a mixture thereof.

A homopolyamide or a copolyamide ends either with an amine function and an acid function, when it is obtained by polycondensation of aminocarboxylic acids, by polycondensation of lactams or by polycondensation of diacids and diamines. However, in the latter case, it is also possible to obtain two acid functions or two amine functions.

According to the present invention, chain-terminating agents, also known as chain limiters ("CL"), are compounds that are capable of reacting with the amine end functions of polyamides, thus modifying the reactivity of the amine end of the macromolecule, and thus controlling the polycondensation of the polyamide and also the stability of the melt viscosity of the composition during its transformation.

The termination reaction may be illustrated, for example, in the following manner:

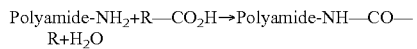

Thus, chain-terminating agents that are suitable for reacting with the amine end functions of the polyamide present in the composition according to the invention are mono- or diacids, preferably containing from 8 to 30 carbon atoms. The diacids may be chosen from adipic acid, decanedioic acid and dodecanedioic acid. The monoacids may be chosen from capric acid, acetic acid, benzoic acid, lauric acid, tridecylic acid, myristic acid, palmitic acid, stearic acid, pivalic acid and isobutyric acid.

Consequently, when the chain-terminating agent is a monoacid, the chain end group is an alkyl group, and when the chain-terminating agent is a diacid, the chain end group is an acid function.

The homopolyamide(s) or copolyamide(s) contained in the composition according to the invention have a content of amine chain ends of less than 0.04 meq/g, preferably less than 0.025 meq/g and preferentially less than 0.015 meq/g.

It is possible, according to the invention, to have a polyamide with a zero content of amine chain ends. This means that all the amine chain ends have reacted with a chain limiter and that the polyamide no longer contains any free amine functions at its ends.

The content of chain-end amine functions is conventionally measured, in a manner known to those skilled in the art, by potentiometry: the concentration of amine chain ends is measured after dissolving the polyamide in meta-cresol, by assaying with perchloric acid.

Advantageously, the inherent viscosity of the polyamide of the composition according to the invention is between 0.5 and 3.0 dl/g and preferably between 0.9 and 1.4 dl/g. The inherent viscosity is evaluated according to Standard ISO 307.

The composition according to the invention also comprises between 24% and 40% by weight and preferably between 24% and 30% by weight, relative to the total weight of the composition, of at least one reinforcer.

The reinforcer may be chosen from glass beads, glass fibres, carbon fibres, polymer fibres and natural fibres, and mixtures thereof.

When the reinforcer is in the form of fibres, these fibres may have a length of between 0.1 and 25 mm and advantageously between 0.1 and 10 mm.

Preferably, the reinforcer used is formed from glass fibres, in which the length of the fibre is advantageously between 0.10 and 25 mm and preferably between 0.1 and 5 mm.

When the reinforcer used is formed from carbon fibres, these fibres advantageously have a length of between 2.0 and 8.5 mm. If these carbon fibres are cylindrical, their diameter may advantageously be between 6 and 8 µm.

A coupler may be included therein to improve the adhesion of the fibres to the polyamide, such as silanes or titanates, which are known to those skilled in the art.

The composition according to the invention also comprises, as flame retardant, at least one metal salt chosen from a metal salt of phosphinic acid, a metal salt of diphosphinic acid, and a mixture thereof.

The metal salt of the phosphinic acid or the metal salt of the diphosphinic acid may also be contained in a polymer.

The content of such a flame retardant is between 24% and 35% by weight and preferably between 24% and 30% by weight relative to the total weight of the composition.

Preferably, the metal salt of the phosphinic acid according to the invention is of Formula (I) below and the metal salt of diphosphinic acid is of Formula (II) below:

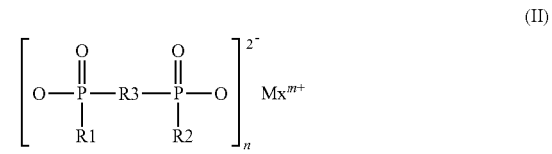

with
R₁ and R₂, independently of each other, denoting a linear or branched $C_1$-$C_6$ alkyl group, or an aryl group;
R₃ representing a linear or branched $C_1$-$C_{10}$ alkylene, $C_6$-$C_{10}$ arylene, $C_6$-$C_{10}$ alkylarylene or $C_6$-$C_{10}$ arylalkylene group,
M being an Mg, Ca, Al, Sb, Sn, Ge, Ti, Zn, Fe, Zr, Ce, Bi, Sr, Mn, Li, Na or K ion and/or a protonated amine base,
m denoting an integer from 1 to 4,
n denoting an integer from 1 to 4,
x denoting an integer from 1 to 4,
n and m being chosen such that the salt is neutral, i.e. such that it does not bear an electrical charge.

Preferably, M represents an ion chosen from calcium, magnesium, aluminium and zinc.

Preferably, R₁ and R₂, independently of each other, denote a methyl, ethyl, n-propyl, isopropyl, n-butyl, tert-butyl, n-pentyl and/or phenyl group.

Preferably, R₃ represents a methylene, ethylene, n-propylene, isopropylene, n-butylene, tert-butylene, n-pentylene, n-octylene, n-dodecylene; phenylene, naphthylene; methylphenylene, ethylphenylene, tert-butylphenylene, methylnaphthylene, ethylnaphthylene, tert-butylnaphthylene; phenylmethylene, phenylethylene, phenylpropylene or phenylbutylene.

Preferably, the metal salt of the mono- and diphosphinic acid may be chosen from the salts of the following compounds: dimethylphosphinic acid, ethylmethylphosphinic acid, diethylphosphinic acid, isobutylmethylphosphinic acid, octylmethylphosphinic acid, methyl-n-propylphosphinic acid, methane-1,2-bis(methylphosphinic acid), ethane-1,2-bis(methylphosphinic acid), hexane-1,6-bis(methylphosphinic acid), benzene-1,4-bis(methylphosphinic acid), methylphenylphosphinic acid and diphenylphosphinic acid.

Preferably, the salt is chosen from aluminium methylethylphosphinate and aluminium diethylphosphinate.

Mixtures containing this metal salt that are advantageously used are sold by the company Clariant under the trade names Exolit OP1311, OP1312, OP1230 and OP1314.

The composition according to the invention may also comprise common additives for polyamides, such as dyes, light (UV) stabilizers and/or heat stabilizers, plasticizers, impact modifiers, surfactants, pigments, optical brighteners, antioxidants, natural waxes, functional or non-functional, crosslinked or non-crosslinked polyolefins, mould-release agents or fillers.

The envisaged fillers include standard mineral fillers, such as those chosen from the group, given in a non-limiting manner, comprising talc, kaolin, magnesia, slag, silica, carbon black, carbon nanotubes, expanded or non-expanded graphite, and titanium oxide.

Preferably, the additives of the composition according to the present invention may be present in an amount of less than or equal to 20% and preferably less than 10% by weight relative to the weight of the composition.

The invention also relates to a process for preparing a composition as defined above. According to this process, the composition may be prepared via any method that makes it possible to obtain a homogeneous mixture containing the composition according to the invention, and optionally other additives, such as melt extrusion, compacting or roll blending.

More particularly, the composition according to the invention is prepared by melt-blending all the ingredients in a "direct" process.

Advantageously, the composition may be obtained in the form of granules by compounding on a tool known to those skilled in the art, such as: a twin-screw extruder, a co-kneader, or an internal blender.

The composition according to the invention obtained via the preparation process described above may then be transformed for use or a subsequent transformation known to those skilled in the art using tools such as: an injection press, an extruder, etc.

The invention thus relates also to an article obtained by injection, extrusion, coextrusion or multi-injection using at least one composition as defined above.

The process for preparing the composition according to the invention may also use a twin-screw extruder feeding, without intermediate granulation, an injection press or an extruder according to an implementation device known to those skilled in the art.

The composition according to the invention may be used for making a structure. This structure may be a monolayer when it is formed only from the composition according to the invention. This structure may also be a multilayer structure, when it comprises at least two layers and when at least one of the various layers forming the structure is formed from the composition according to the invention.

The structure, whether it is monolayer or multilayer, may especially be in the form of fibres (for example to form a woven or a nonwoven), a film, a sheet, a tube, a hollow body or an injection-moulded item. For example, the films and sheets may be used in fields as varied as electronics or decoration.

The composition according to the invention may advantageously be envisaged for the production of all or part of components of electrical and electronic goods, such as encapsulated solenoids, pumps, telephones, computers, monitors, camera remote control units, circuit breakers, electrical cable sheaths, optical fibres, switches and multimedia systems. It may also be used for the production of all or part of motor vehicle equipment such as tubes, tube connectors, pumps, injection-moulded parts under the engine bonnet, injection-moulded parts such as bumpers, floorboards, and door trim. The motor vehicle equipment components, when they are in the form of tubes and/or connectors, may be used in particular in air-admission devices, cooling devices (for example with air, coolant liquid, etc.), or devices for transporting or transferring fuels or fluids (such as oil, water, etc.). It may also be used for producing all or part of surgical material, packaging, or sports or leisure articles, such as in bicycle equipment (saddle, pedals). Such components may obviously be made antistatic or conductive, by prior addition of suitable amounts of conductive fillers (such as carbon black, carbon fibres, carbon nanotubes, etc.) to the composition according to the invention.

Other aims and advantages of the present invention will emerge on reading the examples that follow, which are given without any implied limitation.

EXAMPLES

1. Preparation of the Compositions

Three compositions A1, B1 and C1 are prepared, comprising:

47% of homopolyamide PA11 obtained by polycondensation of aminoundecanoic acid derived from biomass, 24.5% of glass fibre (Asahi: CS FT 692)

24.5% of phosphinate (Exolit OP 1311 from Clariant),

1% of additives: 0.4% Irganox 1010 from Ciba—0.3% calcium stearate from BASF—0.3% wax E from CECA 3% of MM black 6005 ethylene C4 from BASF.

Polyamides A, B and C used to prepare the compositions are given in the table below:

TABLE 1

| Polyamide PA 11 used | Chain limiter ("CL") (% of CL by weight/ aminoundecanoic acid) |
|---|---|
| Polyamide A (comparative) | none |
| Polyamide B (comparative) | Laurylamine (0.46%) |
| Polyamide C (Invention) | Lauric acid (0.5%) |

The production of compositions A1, B1 and C1 is performed by compounding polyamides A, B and C, respectively, on a Werner 40 co-rotating twin-screw extruder at 260° C., the glass fibres and the flame retardant being added via side feeds.

The content of chain-end amine functions is measured conventionally, in a manner known to those skilled in the art, via potentiometry: the chain-end amine concentration is measured after dissolving the polyamide in meta-cresol, by assay using perchloric acid (0.02N solution).

The physicochemical characteristics of polyamides A, B and C are collated in Table 2 below:

TABLE 2

| Polyamide PA 11 used | Chain limiter (% of CL by weight/ amino- undecanoic acid) | Inherent viscosity η (dl/g) | Content of chain-end $NH_2$ (meq/g) | Content of chain-end $CO_2H$ (meq/g) |
|---|---|---|---|---|
| Polyamide A (comparative) | none | 1.29 | 0.062 | 0.060 |
| Polyamide B (comparative) | Laurylamine 0.46% | 1.31 | 0.048 | 0.027 |
| Polyamide C (Invention) | Lauric acid 0.5% | 1.30 | 0.023 | 0.048 |

The inherent viscosity (noted η) is measured according to Standard ISO 307.

Without chain limitation, a homopolyamide PA11 has a viscosity of between 1.0 and 1.4 dl/g, and its amine concentration is between 0.05 and 0.065 meq/g.

2. Measurement of the Melt Viscosity

The melt viscosity is measured by capillary rheometry at 260° C., at a shear rate of 100 s$^{-1}$.

The measurements performed are:

measurement of the viscosity in Pa·s of the homopolyamides A, B and C alone, each corresponding to the polymer matrix of compositions A1, B1 and C1, respectively, measurement of the viscosity of compositions A1, B1 and C1.

The measurements are reported in Table 3 below:

TABLE 3

| Homo- polyamide | Melt viscosity (Pa · s) | Final composition | Melt viscosity (Pa · s) |
|---|---|---|---|
| Polyamide A (Comparative) | 170 | A1 (Comparative) | 576 |
| Polyamide B (Comparative) | 253 | B1 (comparative) | 505 |
| Polyamide C (Invention) | 274 | C1 (Invention) | 385 |

The results show that the presence in the polymer matrix of fillers and of the flame retardant increases the viscosity of the composition.

Comparison of the Results for Compositions B1 and C1:

It is found that, at an equivalent melt viscosity of the polyamide of the composition (B=253 Pa·s and C=274 Pa·s), composition C1 comprising the limited polyamide C according to the invention has a smaller melt viscosity (385 Pa·s) than composition B1 comprising the comparative polyamide B (505 Pa·s).

Comparison of the the Results for Compositions A1 and C1:

It is found that, starting with a lower melt viscosity for an unlimited polyamide (A=170 Pa·s), a much higher melt viscosity is obtained for the composition (A1=576 Pa·s) than that obtained for the composition of the invention (C1=385 Pa·s) comprising the amine-limited polyamide C.

This result demonstrates that the content of chain-end amine in the polyamide(s) used in the composition has a direct impact on the melt viscosity of the final composition.

This result shows in particular that controlling the content of chain-end amine leads to better control of the melt viscosity of the composition.

Specifically, the difference in melt viscosity between the composition and the particular polyamide used for the composition is smaller when the content of chain-end amine in the polyamide is lower.

3. Measurement of the Change in Melt Viscosity as a Function of Time

The change over time of the melt viscosity was studied. Thus, the initial viscosity of the composition is measured at an imposed shear rate (1 rad/s) and at an imposed temperature (260° C.). The viscosity of the composition is then measured as a function of time (30 minutes). The measurements are taken using an ARES machine.

A percentage is calculated in order to demonstrate the change in melt viscosity of the test compositions.

The results are reported in Table 4 below:

TABLE 4

| Composition | Melt viscosity at t = 0 (Pa · s) | Melt viscosity at t = 30 min (Pa · s) | Change (%) |
|---|---|---|---|
| A1 (comparative) | 19 832 | 76 458 | +285 |
| B1 (comparative) | 18 334 | 35 013 | +91 |
| C1 (invention) | 16 355 | 20 742 | +17 |

This study shows the improved stability (small rise in melt viscosity) over time of composition C1 according to the invention.

In the course of transformation of the material, the stagnation time of the compositions in an injection press may be between 3 and 30 minutes. The stagnation time depends on the size of the item to be injection-moulded, the cycle time and the volume of the injection-moulding unit. These parameters illustrate the importance of having a composition whose melt viscosity is stable over time.

4. Study of the Transformation of the Compositions 4.1 Study of the Flow Length

Moulding on a helical mould 2 mm thick, at a temperature of 260° C., in a mould maintained at 70° C., at a pressure of 900 bar is performed using a pin point threshold. The longer the distance covered by the material in the mould, i.e. the flow length, the more fluid the material. The flow length is measured for the test compositions. A percentage change is calculated relative to the comparative composition A1.

The results are reported in Table 5 below:

TABLE 5

| Composition | Flow length (mm) | Change (%) |
|---|---|---|
| A1 (comparative) | 190 | — |
| B1 (comparative) | 220 | +17 |
| C1 (invention) | 263 | +38 |

This study shows that composition C1 according to the invention is much more fluid, i.e. much easier to work, than the comparative compositions A1 and B1.

4.2 Moulding of Bars

80×10×4 mm³ bars prepared from the injection-moulded compositions were evaluated according to a standard method (Table 6).

TABLE 6

| Composition | Injection-moulding temperature required (° C.) | Comments |
| --- | --- | --- |
| A1 | 260-280 | Fumes |
| B1 | 260-280 | Fumes |
| C1 | 240-260 | No fumes |

The temperature required to fill the cavity is of the order of 260-280° C. for the comparative compositions A1 and B1. These compositions moreover generate fumes associated with their use at high temperature, leading to the formation of aspect defects on the item. Composition C1 according to the invention makes it possible to avoid the formation of these fumes by virtue of a lower working temperature that it is possible to use by virtue of its better fluidity.

5. Properties of the Bars According to the Invention

Flexural Modulus:

The bars were evaluated according to Standard ISO 178-93. The flexural modulus and the breaking stress are measured (MPa).

Charpy Impact:

The bars of composition C1 according to the invention were evaluated according to Standard ISO 179. They are tested in the Charpy pendulum impact test ISO 179-1eU with a pendulum of 7.5 joules. The energy absorbed by the bars, expressed in kJ/m², is measured.

Fire Test:

classification of the materials according to UL94—Vertical Burning

The flame propagation test usually performed, known as UL94 according to Standard NFT 51072, is performed in specimens 3.2 mm, 1.6 mm or 0.8 mm thick prepared from composition C1 according to the invention.

The classification V0 is the best classification according to this test. It corresponds to a sparingly flammable material, that does not produce enflamed drops during the test.

For the classification V1, the material is more easily flammable, but does not produce any enflamed drops during the test.

The classification V2 withstands longer extinction times and the presence of enflamed drops during combustion.

The results are presented in Table 7 below:

TABLE 7

| Flexural modulus at 23° C. (MPa) | 6161 |
| --- | --- |
| Breaking stress (MPa) | 126.2 |
| Charpy impact at 23° C. with resilience notch (kJ/m²) | 11.6 |
| UL 94 (0.8 mm) | V0 |

6. Flame-Retardant Properties of the Bars According to the Invention

Compositions C2, C3 and C4 were prepared in accordance with the protocol described in paragraph 1 above. These compositions comprise the products listed below, the respective weight proportions of polyamide, of reinforcer (glass fibres) and of flame retardant being mentioned in Table 7 below:

polyamide C (homopolyamide PA11 obtained by polycondensation of aminoundecanoic acid derived from biomass in the presence of 0.5% lauric acid as chain limiter) comprising a content of chain-end $NH_2$ of 0.023 meq/g, glass fibres (Asahi: CS FT 692), phosphinate (Exolit OP 1314 from Clariant), 1% additives: 0.4% Irganox 1010 from Ciba+0.3% calcium stearate from BASF+0.3% Wax E from CECA, and 3% MM black 6005 euthylene C4 from BASF.

The flame propagation test UL94 described in paragraph 5 above was performed in specimens 3.2 mm, 1.6 mm or 0.8 mm thick made from each of the compositions C2 (according to the invention), C3 and C4 (comparative).

The combustion time of the specimen (referred to as the "sum of the 10 times" in Table 8) is measured in this test. This evaluated sum of the times consists of the sum of the 5 times obtained at the first extinction of the specimen after ignition, plus the sum of the 5 times obtained at the second extinction of the specimen after ignition. This experiment is explained in greater detail in Standard NFT 51072. To obtain the classification V0, a sum of the times of less than 50 s must necessarily be obtained.

TABLE 8

| Composition | C2 (according to the invention) | C3 (comparative) | C4 (comparative) |
| --- | --- | --- | --- |
| Polyamide C | 47 | 49 | 51 |
| Glass fibres | 24.5 | 22.5 | 22.5 |
| Phosphinate | 24.5 | 24.5 | 22.5 |
| Additives | 1 | 1 | 1 |
| Black | 3 | 3 | 3 |
| Sum of the 10 times (s) | 35 | 57.8 | 78.1 |
| UL 94 (0.8 mm) | V0 | V1 | V2 |

It is thus seen that, among the 3 compositions tested, only composition C2 makes it possible to achieve the classification V0 which corresponds to a material that is difficult to ignite and that does not produce enflamed drops during the test.

The respective weight proportions of the main compounds included in the composition according to the invention, namely the reinforcer(s), flame retardant(s) and polyamide(s), thus play an important role in simultaneously obtaining a composition that is easier to use, by virtue of a lower melt viscosity of the composition (see paragraphs 2 and 4.1) and that is also more stable over time (see paragraph 3) and which makes it possible to obtain a material that has good properties in terms of impact strength and rigidity (see paragraph 5) and also excellent flame-retardant properties (see paragraphs 5 and 6).

The invention claimed is:

1. A reinforced flame-retardant polyamide composition comprising polyamide(s), reinforcer(s) and flame retardant(s), the percentages being given in relation to the total weight of the composition:

25% and 52% by weight of at least one semi-crystalline or amorphous polyamide, having an amine chain-end content of less than 0.040 meq/g, 24% and 40% by weight of at least one reinforcer, and 24% and 35% by weight of at least one metal salt optionally contained in a polymer, chosen from a metal salt of phosphinic acid, a metal salt of diphosphinic acid, and a mixture thereof.

2. The composition according to claim 1, wherein the polyamide comprises at least 50% of organic carbon derived from biomass determined according to Standard ASTM D6866.

3. The composition according claim 1, wherein the polyamide has a content of chain-end amine of less than 0.025 meq/g.

4. The composition according claim 1, wherein the polyamide has a content of chain-end amine of less than 0.015 meq/g.

5. The composition according to claim 1, wherein the reinforcer(s) are glass beads, glass fibers, carbon fibers, polymer fibers and natural fibers, or mixtures thereof.

6. The composition according to claim 1, wherein the metal salt is at least one metal salt of phosphinic acid of Formula (I) below or at least one metal salt of diphosphinic acid of Formula (II) below:

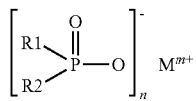  (I)

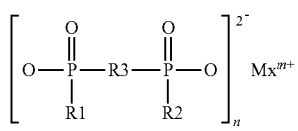  (II)

with
$R_1$ and $R_2$, independently of each other, denoting a linear or branched $C_1$-$C_6$ alkyl group, or an aryl group;
$R_3$ representing a linear or branched $C_1$-$C_{10}$ alkylene, $C_6$-$C_{10}$ arylene, $C_6$-$C_{10}$ alkylarylene or $C_6$-$C_{10}$ arylalkylene group,
M is a calcium, magnesium, aluminium or zinc ion,
m is 2 or 3,
n is 1 or 3,
x is 1 or 2,
n and m being such that the salt is neutral.

7. The composition according to claim 1, in the form of an injection-molded item, fibre, film, sheet, tube or hollow body.

8. The composition according to claim 1, wherein the polyamide is PA 6.10, PA B.12, PA 10.12, PA 10.10, PA 6.12, PA11, PA11/6.T, PA11/10.T, PA11/B.10, PA11/6, PA11/6.10, PA11/6.12, PA11/6.6, PA11/10.12 or PA11/B.I/B.T.

9. The composition according to claim 8, wherein the polyamide is PA11, PA11/10.T or PA11/B.10.

10. The composition according to claim 1, further comprising at least one additive that is a dye, stabilizer, UV stabilizer, plasticizer, impact modifier, surfactant, pigment, optical brightener, antioxidant, natural wax, polyolefin, molding agent, filler, or a mixture thereof.

11. The composition according to claim 10, wherein the filler is talc, kaolin, magnesia, slag, silica, carbon black, carbon nanotubes, expanded or non-expanded graphite, or titanium oxide.

12. A process for preparing the composition according to claim 1, comprising melt blending all components of the composition.

13. Cases, connectors, tubes, telephone or computer shells or items used in the electrical and electronic fields, prepared from a composition according to claim 1.

14. An article obtained by injection-molding, extrusion, coextrusion or multi-injection of at least one composition according to claim 1.

* * * * *